United States Patent Office 2,706,998
Patented Apr. 26, 1955

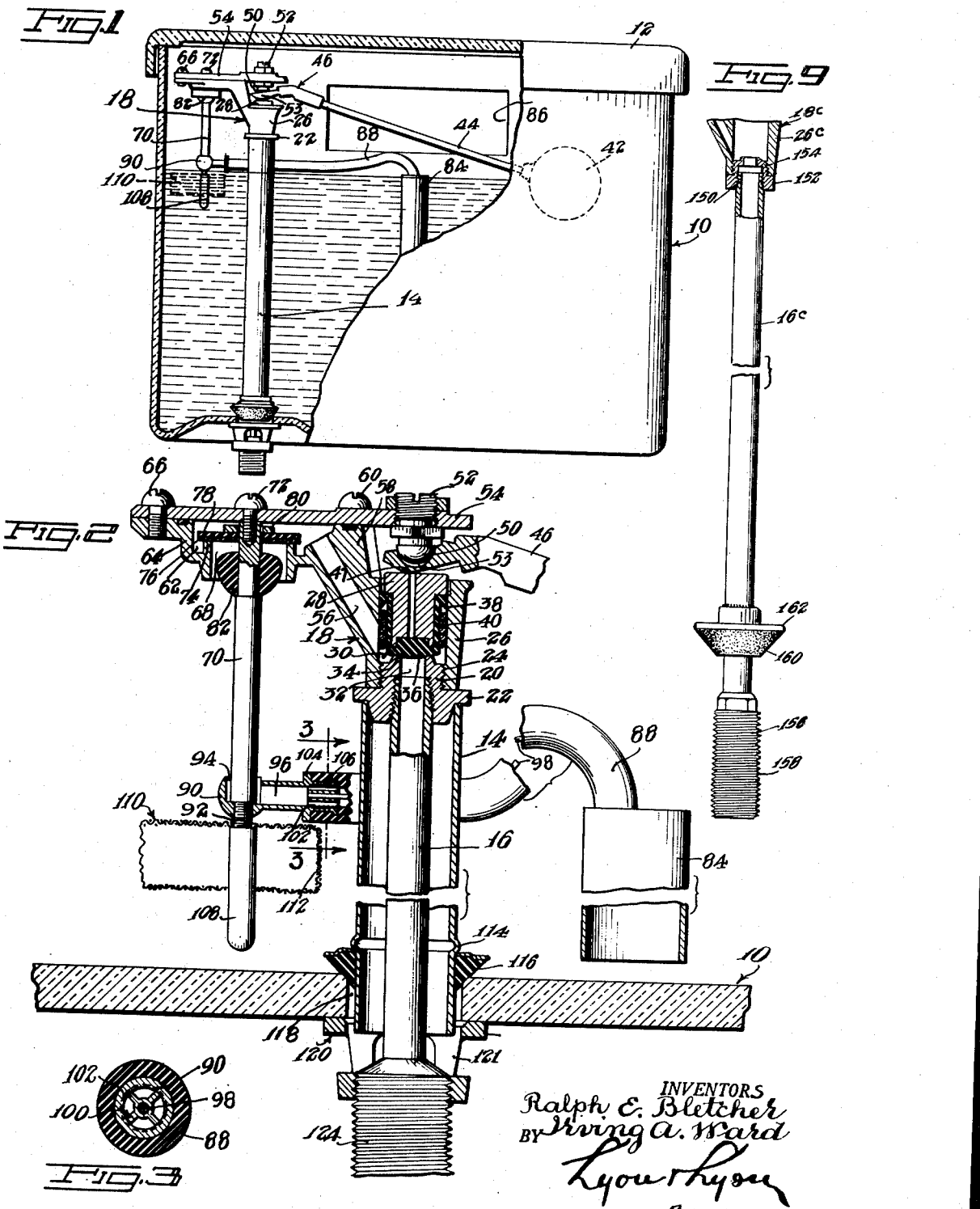

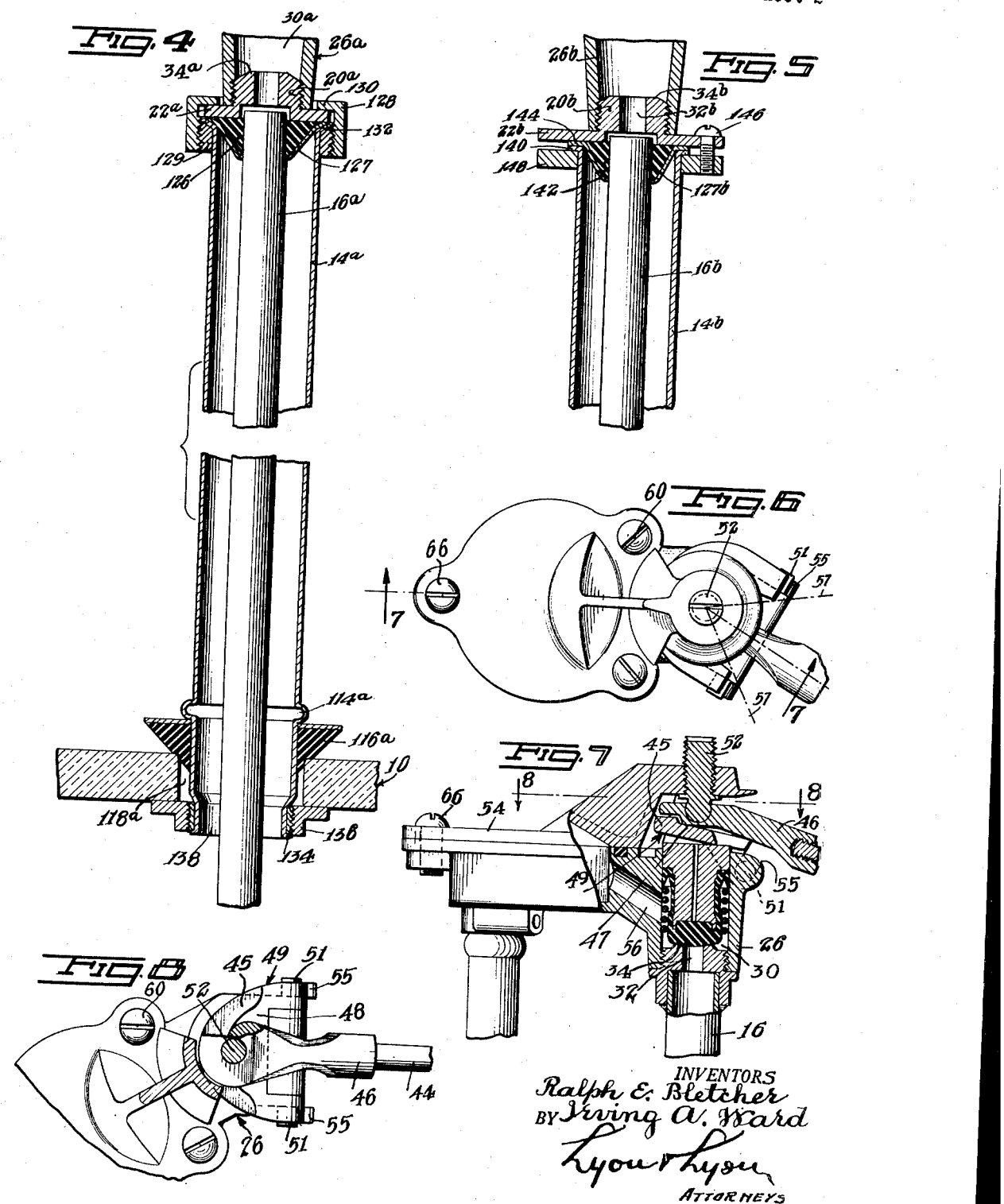

2,706,998

BALL COCK

Ralph E. Bletcher and Irving A. Ward, Los Angeles, Calif., assignors, by direct and mesne assignments, of five per cent to said Ralph E. Bletcher, twelve and one-half per cent to Ernest H. Bucknell, twelve and one-half per cent to Mabel Bucknell, ten per cent to Pearl W. Bletcher, twenty-five per cent to Marcia B. Liston, ten per cent to Jarvis H. Bletcher, ten per cent to Hazel B. Skinner, eight per cent to Charlotte R. B. Robertson, two per cent to Frederick K. Robertson, as trustee, and five per cent to James H. Bletcher, as trustee.

Application October 27, 1950, Serial No. 192,418

9 Claims. (Cl. 137—436)

This invention relates to a new and improved anti-siphon ball cock assembly.

It is an object of this invention to provide a ball cock and associated means for delivery of water to the conventional flush type tank wherein anti-siphon means are present between the potable water supply and the polluted water in the tank.

It is a further object of this invention to provide a ball cock wherein the water supply tube is isolated from contact with the polluted water.

It is a further object of this invention to provide a ball cock of such construction that a plumber may stock only one size of ball cock and be equipped to handle any type of installation.

It is a further object of this invention to provide a ball cock wherein the ball cock control means is pivotally mounted to prevent its fouling and to insure free and accurate control of the ball cock.

It is a further object of this invention to provide a ball cock which may be readily adjusted to control the volume of flow of potable water into a tank.

It is a further object of this invention to provide a ball cock which may be mounted within a very small distance from the top of a flush type tank, thereby providing easy access to the ball cock for adjustment or repair and to most effectively utilize the space between the tank cover and the top of the overflow tube.

It is a further object of this invention to provide a ball cock wherein all threadable connections are either above or below the normal water level of the tank to eliminate the possibility of corrosion and rust of the threaded connections.

It is a further object of this invention to provide a ball cock wherein the refill tube is easily aligned with the overflow tube and may be removed or replaced with a minimum of effort and wherein the refill tube water ways are not connected to the ball cock water ways, thereby preventing any possible siphoning from the polluted water to the potable water supply.

It is a further object of this invention to provide a ball cock wherein the potable water is delivered to the tank through an open air gap to prevent any back siphoning developing and wherein a self-cleaning silencer unit is provided to eliminate the noise of the water upon entry into the tank.

The invention generally comprises a water supply tube surrounded by isolating means, ball cock control means associated with said supply tube and isolation tube, a water discharge from said control means through a substantial air gap, a refill tube and pickup means, water silencing means, and means for securing the isolation tube in a flush type tank wherein the isolation tube is vented to the atmosphere outside of the tank and wherein all threaded connections are above or below the water in the tank.

Other objects and advantages will be readily apparent from the following description of the preferred embodiments thereof.

In the drawings:

Figure 1 is a side elevation of a ball cock assembly embodying this invention installed in the conventional flush tank.

Figure 2 is a side elevation in section, illustrating the details of construction of the ball cock assembly.

Figure 3 is a sectional view taken along the line 3—3 of Figure 2.

Figure 4 is a side elevation in section of a modification of the connections between the tank and the isolation tube and the ball cock and isolation tube.

Figure 5 is a further modification of the connection between the isolation tube and the ball cock.

Figure 6 is a plan view of a modification of the ball cock control means.

Figure 7 is a side elevation partially in section of the modification of the ball cock control means.

Figure 8 is a plan view of the modification with a portion of the cover plate broken away.

Figure 9 is a side elevation of a further modification of this invention.

A flush tank 10, with a removable lid 12, is provided to store water for use in the conventional flush type toilet. An isolation tube 14 is mounted in the base of the tank in a manner which will hereinafter be described. The isolation tube surrounds the water supply tube 16 which is suitably connected to the potable water supply. Mounted at the upper extremity of the isolation tube in a manner which will hereinafter be described, is a ball cock generally designated 18, which controls the admission of potable water through the water supply tube 16 into the tank.

Referring particularly to Figure 2, the water supply tube 16 may be threaded externally at its upper extremity to receive the internally threaded connecting nut 20. The connecting nut 20 is provided with a flange 22 which bears against the upper extremity of the isolation tube 14 when secured to the water supply tube 16, thereby providing a relatively water-tight connection between the connecting nut 20 and the isolation tube 14. The connecting nut 20 is externally threaded at its upper extremity as at 24 to be screwed into the internally threaded housing 26.

The housing 26 is provided with an internal chamber 30 adapted to receive a valve or plunger 28 which is free to move vertically within the chamber 30. The connecting nut 20 is provided at its upper extremity with a passage 32 which forms a continuation of the water passage through the water supply tube 16 and at its upper extremity forms the valve seat 34. A resilient valve seating member 36 is slidably mounted on the valve or plunger 28 and at its lower extremity forms a seating surface which when the valve body is in the position shown in Figure 2, bears against the valve seat 34, preventing flow of water through the water supply tube 16 and the connecting nut 20 into the chamber 30. At its upper extremity, the resilient valve seating member is provided with a downturned flange 38, which, when water is flowing into the chamber 30 is forced outwardly against the housing 26 by the water pressure thereby providing a seal against the flow of water out of the top of the ball cock. A spring 40, preferably of Monel metal, acts as a guide for the valve 28, insuring true vertical motion of the valve 28 in the chamber 30 of the housing 26.

The ball cock control means of the principal embodiment of this invention as shown in Figures 1 and 2 is as follows:

The vertical motion of the valve or plunger 28 is controlled by the conventional ball 42 through the lever arm 44. The lever 44 is provided at its extremity nearest the ball cock with external threads adapted to be screwed into the corresponding internal threads in one extremity of the valve control member 46. The valve control member 46 is adapted at its other extremity to bear against the valve or plunger 28. The upper surface of the valve control member is provided with a socket 53 which is shaped to receive the ball 50 mounted on the extremity of the bolt 52, which in turn is threaded to screw through a suitably threaded aperture in the cover plate 54 forming a ball and socket joint.

The raising and lowering of the ball 42 pivots the valve control member 46, which at one extremity is pivotally retained between the ball and socket joint pivthe valve or plunger 28. The lower surface of the valve control member 46 is preferably provided with a peak 47 to accentuate the pivotal action of the valve control member when bearing against the valve 28, opening the valve when the ball 42 is lowered and closing the valve when the ball 42 is raised.

By providing a ball and socket joint retaining the valve control member, the ball 42, lever 44 and valve control member 46 are free to rotate in a horizontal arc, which greatly reduces the possibility of ball 42 becoming fouled below the normal water level and holding valve 28 in the open position.

Figures 6, 7 and 8 illustrate a modified form of the pivotal connection between the valve or plunger 28 and valve control member 46. In this modification the lower surface of the valve control member 46 is provided with a raised portion 45 adapted to fit within a recess 48 in the rocker 49. The rocker 49 is pivotally connected to the housing 26 by the pins 51 on the housing 26, which slide into suitable hooks 55 on the rocker 49.

The functioning of this modifiction is the same as the principal embodiment, it being apparent that the difference lies in adding the rocker 49 between the valve control member 46 and the valve 28. It is apparent that the width of the recess 48 and the shape of the raised portion 45 can be varied to control the limits of the horizontal arc through which the ball 42, lever 44 and valve control member 46 may pivot, which limits are indicated by the lines 57 in Figure 6.

When the water in the tank 10 is delivered to the toilet bowl, the ball 42 falls downwardly, the valve control member 46 pivots downwardly about the ball 50, releasing the pressure on the rocker 49 and permitting the valve 28 to rise, unseating the seating member 36 from the valve seat 34 and permitting flow into the chamber 30. By vertical adjustment of the bolt 52 and thereby of the ball 50, it is possible to adjust the pivoting point of the valve control member 46 and thereby control the level of water in the tank 10. By screwing the bolt 52 into the cover plate 54, the distance the ball 42 must raise to pivot the valve control member 46 to close the valve is reduced. Similarly, by unscrewing the bolt 52 and raising the ball 50, the amount of the pivoting motion of the valve control member 46 necessary to close the valve is increased, which means the ball 42 must be at a higher level in the tank and the water level must be increased.

The housing 26 is provided with an internal water passage 56, preferably leading diagonally upward from the chamber 30 and terminating at the upper extremity 58 of the housing which may be secured to the cover plate 54 by a screw 60. After water has passed through the water passage 56 it enters the chamber 62 which is formed between the cover plate 54 and the outer portion 64 of the housing 26, which is also secured to the cover plate 54 by a screw 66. The chamber 62 is provided with the central discharge opening 68 through which the water passes into the tank 10. It is preferred that this discharge opening 68 be positioned above the connection between the ball cock and the isolation tube to insure a substantial air gap between the discharge opening and the highest level of water in the tank 10 which in turn eliminates the possibility of a back-siphon from the water in the tank to the potable water supply.

It is preferred to provide in the discharge opening a spike 70 which is centrally located within the discharge opening and secured to the cover plate 54 by a screw 72. In the chamber 62 above the discharge opening 68, it is preferred to provide a circular flange 74 projecting upwardly into the chamber 62. A screen 76 is provided to cover the opening formed by the flange 74 and the screen is provided with a central aperture adapted to fit about the spike 70. Located above the screen 76 it is preferred to provide a resilient washer 78 and a metal washer 80 which fit about the spike 70 and rest upon the screen 76. The screen 76 and the resilient washer 78 and metallic washer 80 are free to move vertically upward or downward. The water in the chamber 62 flows through the screen 76 and downwardly into the discharge opening 68, the screen functioning to finely divide the flow of water and to eventually distribute it throughout the discharge opening 68. It is preferred to provide a ball 82 about the spike 70 in the discharge opening 68 so that the water passing through screen 62 will fall upon the ball 82 and flow around the outer circumference of the ball and follow down along the spike 70.

The water level in the tank is maintained at approximately the level indicated in Figure 1 by the conventional overflow tube 84. It is preferred to position the connection between the isolating tube 14 and the ball cock housing 26 a substantial distance above the overflow tube and the usual water level. By the utilization of an isolating tube 14 and a connection between the water supply tube 16 and the ball cock similar to the one heretofore described, the position of the ball cock with reference to the overflow tube and the conventional water level is controlled by the length of the isolating tube. Similarly the length of the isolating tube determines the proximity of the ball cock to the removable lid 12 of the tank 10. It has been found that at least one inch clearance between the overflow tube 84 and the connection between the ball cock and the isolating tube is desirable.

A secondary overflow may be provided by an opening 86 in the rear wall of the tank 10. The lower extremity of the opening 86 may be positioned between the level of the overflow tube 84 and the connection between the ball cock and the isolating tube so that in the event the primary overflow 84 becomes clogged and the water level continues to rise due to fouling of the ball 42 maintaining valve or plunger 28 in the open position, the water will spill through opening 86 and prevent the level of the water rising to the position of the above mentioned connection. This eventuality is of course substantially eliminated by the pivotal connection of the valve member 46 to the ball cock, as has hereinbefore been described, guarding against fouling of the ball 42 by permitting it to swing through a substantial horizontal arc.

A refill tube 88 is provided attached to the spike 70 a substantial distance below the discharge opening 68 by means of a sleeve 90, the sleeve 90 being internally threaded on its underside and being screwed onto the lower extremity of the spike 92. The sleeve 90 is provided with an annular space 94 about the spike 70 so that a portion of the water flowing down the spike passes into the annular space 94. The water then passes through the passage 96 in the sleeve 90 and enters into the refill tube 88 and is directed by the refill tube 88 into overflow tube 84, from where it passes to the toilet bowl as is well known to those skilled in the art. It is preferred to construct the refill tube 88 of a resilient material, such as rubber, so that it may be readily bent into the appropriate position to discharge into the overflow tube. It is also preferred to mount a relatively pliable but inelastic guide wire 98 such as a Monel metal wire in the sleeve 90 in any suitable manner. This connection is herein illustrated as accomplished by a spider 100, the body 102 of which screws into the sleeve 90. This wire should be of sufficient strength so that when the refill tube 88 is bent to the appropriate shape the guide wire 98 will retain the resilient refill tube in this position. It is also desirable to provide a flange 104 on the sleeve 90 against which the extremity of the refill tube bears when the refill tube is slidably mounted on the extremity 106 of the sleeve 90.

An extension 108 of the spike 70 may be provided, internally threaded to screw upon the extremity 92 of the spike 70, to further direct the flow of water into the tank 10. A portion of the water enters the refill tube as above described and the remainder of the water passes about the outside of sleeve 90 and follows the extension 108 downwardly. A screen 110 is suitably mounted on the extension 108 to act as a silencer. The screen 110 may, of course, take many forms and herein is illustrated as two screens mounted on the lower extremity of the spike and connected by a joining section 112. The water upon passing through the screen 110 is finely divided and thoroughly aerated to eliminate a large amount of the noise which would ordinarily occur upon the water leaving the spike and falling into the tank. It is also preferred to locate the silencer screens 110 below the normal water level of the flush tank 10 so that the screens will be cleansed by the rising water level when the tank is filled.

The isolation tube 14 is connected to the base of the tank 10 in Figure 2 as hereinafter will be described. In the particular embodiment seen in Figures 1 and 2 the isolation tube is provided with an annular rim 114 which functions to retain the conical washer 116 between the annular rim and the base of the tank. The conical washer 116 is preferably constructed of a resilient material, such as rubber, and of such a shape as to cut off flow through the opening 118 in the base of the tank. The supply tube 16 is suitably attached to externally threaded pipe 124 and a spider 120 having an internally threaded lower extremity is adapted to fit on pipe 124. When spider 120 is rotated counterclockwise in Figure 2 it tends to draw the supply tube 16 downwardly with respect to the base of the tank and connecting nut 20 forcing isolation tube 14 downwardly with the result that the annular rim 114 forces the resilient conical washer 116 into the opening 118, thereby effectively sealing off flow from inside the tank into the opening 118. The spider 120 is provided with suitable arms 121 spaced sufficiently apart to provide apertures therethrough to communicate the isolation tube with the atmosphere outside of tank 10.

It is obvious that the ball cock is safeguarded against the possibility of a siphon forming between the polluted water in the tank 10 and the potable water in the supply tube 16. The discharge opening is positioned above any probable water level which may develop in the tank and the supply tube 16 is isolated by tube 14 from any contact with the polluted water. In the event of a leak forming in the isolation tube, the water is free to flow downwardly and through the apertures provided between the arms of the spider 120, preventing water from accumulating in the isolation tube and siphoning back through supply tube 16 in the event of a leak also forming in supply tube 16 and when the water pressure in the mains is sufficiently low to form a back siphon.

Referring now to Figure 4, wherein a modified form of the connection between the isolation tube and the ball cock is illustrated, and a modified form of the connection between the isolation tube and the base of the tank is also illustrated, and wherein like parts having like functions will be designated by the same numerals with the addition of the exponent "a." The connecting nut 20a is of the same construction as in the principal embodiment with the exception of the elimination of the internal threads adapted to receive the upper extremity of the water supply pipe 16a. In this embodiment a resilient conical washer 126 is adapted to fit about the upper extremity of the water supply tube 16a and the upper extremity of the supply tube 16a is free above the conical washer 126, a truncated conical member 127 positioning washer 126 on the supply tube. The ring 129 fitting about the isolation tube 14a is provided with external threads adapted to be held by the internal threads of the sleeve 128. The isolation tube being flared at its upper extremity 132 to retain ring 129. The sleeve 128 is provided with an inwardly turned flange 130 which holds the flange 22a of the connecting nut 20a between said inwardly turned flange 130 and the upper extremity 132 of the isolation tube 14a. The upper extremity of isolation tube 14a may be flared slightly outwardly as at 132 so that the outer periphery of the conical washer 126 fits between the flared portion 132 and the flange 22a. It is apparent by tightening the sleeve 128 that the connecting nut 20a and the isolation tube 14a are drawn together and that the conical washer 126 seals off any possible flow from the passage 32a into the isolation tube.

The connection between the isolation tube 14a and the base of the tank 10a is similar to the connection in the principal embodiment, that is an annular ridge 114a functions to force a conical washer 116a into the opening 118a in the base of the tank and prevent flow of water out of this opening. In this embodiment, however, the water supply tube 16a is free with respect to the isolation tube 14a at its lower extremity. The isolation tube at its lower extremity is threaded externally as at 134 and a nut 136 is screwed onto the end of the isolation tube and holds the isolation tube rigidly to the base of the tank. The end of the isolation tube is open as at 138 to prevent accumulation of water in the isolation tube in the event of a leak.

Referring now to Figure 5, wherein a further modification of the connection between the housing and the isolation tube is illustrated and wherein like parts having like functions are given the same numerical designation with the addition of the exponent "b." The connecting nut 20b is constructed the same as in the principal embodiment with the exception of the elimination of the internal threads for receiving the extremity of the water supply pipe 16b. The isolation tube 14b is provided with an outwardly turned flange 140 at its upper extremity and a conical washer 142 is provided to fit about the upper extremity of the water supply pipe 16b and a retaining ring 127b is provided with a flanged portion 144 at its outer periphery corresponding to the flange 140 on the isolation tube 14b. The flange 22b of connecting nut 20b is provided with suitable apertures for bolts 146 and a washer 148 is provided to fit around the isolation tube 14b below the flange 140 and is provided with suitably threaded apertures to receive bolts 146. Thus by tightening the bolts 146, the washer 148 draws toward the flange 22b, drawing with it the flanges 140 and 144 and forming a watertight connection between the ball cock and the supply tube.

It is apparent from the principal embodiment and the two modifications of the connection between the ball cock and the isolation tube that the positioning of the ball cock is determined by the length of the isolation tube used. This enables the plumber to stock only one size of ball cock for any type of installation and by varying the length of the isolation tube he can adapt the ball cock to the particular shape of the tank 10 in which he is working. It is also apparent that providing apertures between the arms of the spider 120 or between opening 138 in the modification of Figure 4 substantial openings are provided to prevent the accumulation of water in the isolation tube 14 or 14a. These openings are preferably large to prevent the house owner from plugging them up and thereby creating a remote possibility of the development of a back siphon to the water main in the event of a leak in the isolation tube and in the water supply tube and water accumulating in the isolation tube.

Referring now to Figure 9 wherein a modification of the attachment between the water supply tube and the ball cock is illustrated and wherein like parts having the same function are given the same numerical designation with the addition of the exponent "c" this modification is adapted to be used in flush-type toilets when an isolation tube is for some reason not desired. The water supply tube 16c is provided at its upper extremity for external threads 150 which are adapted to screw into corresponding internal threads in the nut 152. The nut 152 is provided with a threaded extension 154 which screws into the lower extremity of the housing 26c of ball cock 18c. At the opposite extremity of the water supply tube 16c, external threads are provided adapted to screw into the corresponding internal threads in the ball cock tailpiece 156. The tailpiece 156 is threaded externally as at 158, adapted to be engaged to a source of potable water. A resilient truncated conical sealing member 160 is suitably retained on the supply tube 16c by the annular washer 162 which is welded or otherwise suitably attached to the supply tube. When the tailpiece 156 is inserted into the opening 118 of flush tank 10 the sealing member 160 fits into the opening 118 in the same manner as the conical washer 116 of the principal embodiment. A suitable nut described is screwed onto the external threads 158 of the tailpiece 156 to clamp the whole device rigidly to the tank and to force the sealing member or conical washer 160 into the opening 118. It is apparent that this form of attachment between the ball cock and the flush tank will provide a watertight union between the ball cock and the flush tank in much the same manner as the union described in the principal embodiment and in the other modification. The annular washer 162 is preferably positioned a substantial distance above the joint between the supply tube 16c and tailpiece 156 so that this joint will project outside the flush tank 10c, thus avoiding possible leakage into the potable water supply. Any leakage would be about sealing member 160 and onto the floor.

The operation of this device is as follows:

Potable water under pressure is delivered through the water supply tube 16 from any suitable source into the passage 32 in connecting nut 20. When the level of water in the tank 10 is low the ball 42 falls, pivoting the valve control member 46 about the ball and socket joint, permitting the valve 28 to be forced upwardly by the pressure of the potable water against the resilient valve seat 36. The water then enters the chamber 30 and flows through the water passage 56 into the chamber 62. The water then passes through the screen 76 downwardly through the discharge opening 68, the screen 76 having finely divided the water and distributed it throughout the annular discharge opening. The downwardly moving water adheres to the resilient ball 82, following the contour of the ball 82 and downwardly along the spike 70.

A portion of the water enters the annular space 94 in the refill tube pickup sleeve 90, passing through the passage 96 and into a refill tube 88, then downwardly into the overflow tube 84. The refill tube 88 is retained in the appropriate position by the pliable but inelastic wire 98. The portion of water falling downwardly along the spike 70 which does not enter the annular space 94 passes around the sleeve 90 and endeavors to follow the extension 108 of the spike 70.

A silencing screen or screens 110 may be positioned below the refill tube sleeve 90 through which the water passes before dropping from the extension 108 into the tank 10.

As the level of the water in the tank 10 rises the ball 42 is driven upwardly, pivoting the valve control member 46 about the ball and socket joint so that the peak 47 on the valve control member 46 bears downwardly against the valve 28. When the water level has risen to a predetermined level the valve 28 is forced downwardly so that the resilient sealing member 36 cuts off the flow from the water supply tube 16 into the valve 30. As hereinbefore described, the water level at which the valve is closed is determined by the vertical adjustment of the bolt 52.

While what hereinbefore has been described is the preferred embodiment of this invention, it is apparent that many changes in the details of construction can be resorted to without departing from the scope of this invention or of the appended claims.

We claim:
1. A ball cock assembly for a flush tank, of the type controlling flow of water from a water supply tube extending upwardly in said tank, comprising: a housing having a valve chamber therein; means connecting said housing to the upper extremity of said water supply tube having a passageway therein communicating between said water supply tube and said valve chamber; valve closure means vertically slidable in said valve chamber and adapted to control flow of water therethrough; a ball element adjustably mounted on said housing above said vertically slidable closure means and in axial alignment therewith; and a valve control member mounted between said slidable valve closure means and said ball element having a socket on the upper surface thereof in which said ball element is seated and bearing against said slidable valve closure means on the side opposite said socket; said valve control member being both horizontally and vertically rotatable about said ball element.

2. A ball cock assembly for a flush tank, of the type controlling flow of water from a water supply tube extending upwardly from the tank bottom to a point above the normal water level in said tank, comprising: a housing having a valve chamber therein; means connecting said housing to the upper extremity of said water supply tube having a passageway therein communicating between said water supply tube and said valve chamber, and terminating in a valve seat; a valve closure element vertically slidable in said valve chamber and adapted to cooperate with said valve seat to control flow of water to said valve chamber; said housing including a cover member; a ball element adjustably mounted in said cover member and extending therethrough in vertical alignment with said vertically slidable closure member; and a valve control member mounted between said slidable valve closure member and said ball element having a socket on the upper surface thereof in which said ball element is seated and bearing against said valve closure member on the side opposite said socket; said valve control member being both horizontally and vertically rotatable about said ball element.

3. A ball cock assembly for a flush tank, of the type controlling the flow of water from a water supply tube extending upwardly from the tank bottom to a point above the normal water level in said tank comprising: an isolating member surrounding said water supply tube; a housing having a valve chamber therein; means connecting said housing to the upper extremity of said water supply tube and providing a substantially water-tight seal between said isolating means and said housing, said means having a passageway therein communicating between said water supply tube and said valve chamber; a valve closure element vertically slidable in said valve chamber and adapted to control flow of water therethrough; a ball element adjustably mounted on said housing above said vertically slidable closure member and in axial alignment therewith; a valve control member mounted between said slidable valve closure member and said ball element having a socket on the upper surface thereof in which said ball element is seated and bearing against said slidable valve closure member on the side opposite said socket, whereby said valve control member is both horizontally and vertically rotatable about said ball element; said housing having a discharge passage from said valve chamber terminating in a discharge opening positioned above the upper extremity of said isolating tube; and water flow silencing means mounted on said housing in said discharge opening.

4. An anti-siphon ball cock asesmbly for a flush tank, of the type controlling flow of water from a water supply tube extending upwardly in said tank, comprising: an isolating member adapted to surround said water supply tube; a ball cock comprising a housing having a valve chamber therein; vertically slidable valve means mounted in said valve chamber to control flow of water into said chamber; a pivot element adjustably mounted on said housing above said vertically slidable valve means and in axial alignment therewith; valve control means mounted between said adjustable pivot element and said valve means for opening and closing said valve means; connecting means adapted to engage said ball cock with said water supply tube and to provide a water-tight seal between said ball cock and said isolating tube; said ball cock housing having means defining a downwardly directed water discharge opening positioned above the upper extremity of said isolating means; a spike centrally located in said discharge means and projecting below said discharge opening; and water dividing means in said discharge means surrounding said spike to thereby silence the flow of water moving downwardly around the outside of said spike.

5. An anti-siphon ball cock assembly for a flush tank, of the type controlling flow of water from a water supply tube extending upwardly in said tank, comprising: an isolating member adapted to surround said water supply tube; a ball cock comprising a housing having a valve chamber therein; vertically slidable valve means mounted in said valve chamber to control flow of water into said chamber; a pivot element adjustably mounted on said housing above said vertically slidable valve means and in axial alignment therewith; valve control means mounted between said adjustable pivot element and said valve means for opening and closing said valve means; connecting means adapted to engage said ball cock housing with said water supply tube and to provide a water-tight seal between said ball cock and said isolating tube; said ball cock housing having means defining a downwardly directed water discharge opening positioned above the upper extremity of said isolating means; a spike centrally located in said discharge means and projecting below said discharge opening; a refill tube; and means including a pick-up sleeve attached to said spike for diverting a portion of the water discharged from said ball cock into said refill tube.

6. An anti-siphon ball cock assembly of the type controlling flow of water from a water supply tube into a flush tank, comprising: encasing means for isolating said water supply tube from the water in said tank; an adjustable ball cock for controlling flow of water into said flush tank from said water supply tube; connecting means providing a water-tight connection between said isolating means and said adjustable ball cock; means forming a discharge from said ball cock positioned above the normal water level in said tank; a spike centrally located in said discharge means; water dividing means in said discharge opening surrounding said spike to silence the flow of water flowing downwardly around said spike; a refill tube including a water pick-up sleeve positioned on said spike; and water silencing means surrounding said spike below said pick-up sleeve.

7. An assembly for a flush tank having an upwardly extending water supply tube, comprising: isolating means surrounding said water supply tube; ball cock control means connected to said water supply tube and engaging the top of said isolation tube; means providing a water discharge from said ball cock control means to said tank, said means being positioned to provide a substantial air gap between the discharge end thereof and the normal water level of said tank; water silencing means mounted in said water discharge means; a refill tube including water pick-up means positioned to receive water below said water discharge and separated therefrom by an air gap; and means for securing said isolation tube in said tank whereby said isolation tube is vented to the atmosphere outside said tank.

8. In a flush tank of the type having an aperture therein, the combination comprising: a water supply tube extending upwardly through said aperture; a ball cock mounted at the upper extremity of said supply tube to control flow of water through said supply tube; an isolating tube surrounding said water supply tube and adapted to project through said aperture in said tank; means for connecting said ball cock with said water supply tube and overlapping the upper end of said isolating tube to provide a substantially water-tight seal therewith; a truncated conical washer mounted on said isolation tube; and means for engaging said supply tube outside of said tank and for drawing said ball cock downwardly upon said isolation tube thereby forcing said truncated conical washer into said aperture to provide a water-tight seal therebetween.

9. A ball cock assembly for a flush tank of the type controlling flow of water from a water supply tube extending upwardly from the tank bottom to a point near the top of the tank comprising: a housing having a body portion connected to the upper extremity of said water supply tube and a top cover member removably attached to said body portion, said body portion including a valve chamber having an inlet opening communicating with said water supply tube and a radially extending outlet passage; a vertically slidable valve closure element mounted in said valve chamber; a pivot element terminating in a ball shape and adjustably mounted in said cover member and extending therethrough in axial alignment with said vertically slidable valve closure element; a valve control member mounted between said slidable valve closure element and the ball shaped end of said pivot element and having a socket in which said ball shaped end is seated; means in said body portion defining a downwardly directed discharge for water from said radially extending outlet passage; and a spike carried by said cover member and extending downward centrally through said discharge opening; whereby said ball cock assembly is readily accessible from the top of said flush tank and may be easily adjusted and repaired.

References Cited in the file of this patent
UNITED STATES PATENTS

| | | |
|---|---|---|
| 598,133 | Brinkman | Feb. 1, 1898 |
| 602,512 | Lecher et al. | Apr. 19, 1898 |
| 747,447 | Lindenberg | Dec. 22, 1903 |
| 1,025,827 | Parkinson | May 7, 1912 |
| 1,156,719 | Stokes | Oct. 12, 1915 |
| 1,787,601 | Swanberg | Jan. 6, 1931 |
| 2,146,794 | Clemmons | Feb. 14, 1939 |
| 2,173,070 | Brown | Feb. 14, 1939 |
| 2,195,797 | Groeniger | Apr. 2, 1940 |
| 2,209,473 | Price et al. | July 30, 1940 |
| 2,247,525 | Sherwood | July 1, 1941 |
| 2,270,910 | Svirsky | Jan. 27, 1942 |
| 2,277,864 | Horvath | Mar. 31, 1942 |
| 2,277,878 | Morris | Mar. 31, 1942 |
| 2,300,466 | Peterson et al. | Nov. 3, 1942 |